United States Patent
Sridharan et al.

(10) Patent No.: US 11,225,433 B2
(45) Date of Patent: Jan. 18, 2022

(54) SINTERING AID FOR GLASSES FOR MACHINABLE PHYLLOSILICATE BASED STRUCTURES

(71) Applicant: Ferro Corporation, Mayfield Heights, OH (US)

(72) Inventors: Srinivasan Sridharan, Strongsville, OH (US); George E. Sakoske, Independence, OH (US); John J. Maloney, Solon, OH (US); Cody Gleason, Solon, OH (US); Gregory R. Prinzbach, Brecksville, OH (US); Bradford Smith, North Ridgeville, OH (US); Chih Cheng Wang, Taipei (TW)

(73) Assignee: Ferro Corporation, Mayfield Heights, OH (US)

( * ) Notice: Subject to any disclaimer, the term of this patent is extended or adjusted under 35 U.S.C. 154(b) by 338 days.

(21) Appl. No.: 15/740,102

(22) PCT Filed: Dec. 2, 2016

(86) PCT No.: PCT/US2016/064528
§ 371 (c)(1),
(2) Date: Dec. 27, 2017

(87) PCT Pub. No.: WO2017/142606
PCT Pub. Date: Aug. 24, 2017

(65) Prior Publication Data
US 2018/0186687 A1    Jul. 5, 2018

Related U.S. Application Data

(60) Provisional application No. 62/297,339, filed on Feb. 19, 2016.

(51) Int. Cl.
*C03C 4/02* (2006.01)
*C03C 14/00* (2006.01)
(Continued)

(52) U.S. Cl.
CPC .......... *C03C 10/0045* (2013.01); *C03C 3/064* (2013.01); *C03C 3/066* (2013.01);
(Continued)

(58) Field of Classification Search
None
See application file for complete search history.

(56) References Cited

U.S. PATENT DOCUMENTS 3,689,292 A   9/1972   Beall
3,689,293 A * 9/1972   Beall .................. C03C 10/16
                                                    501/3

(Continued)

FOREIGN PATENT DOCUMENTS

CN   1205991 A   1/1999
CN   1827544 A   9/2006
(Continued)

OTHER PUBLICATIONS https://web.archive.org/web/20081006142846/http://www.artiscreation.com/red.html, Pigment Database, accessed Dec. 6, 2019 (Year: 2008).*

(Continued)

*Primary Examiner* — Alison L Hindenlang
*Assistant Examiner* — Andrés E. Behrens, Jr.
(74) *Attorney, Agent, or Firm* — Rankin, Hill & Clark LLP; Christopher J. Korff (57) ABSTRACT

A sintered machinable glass-ceramic is provided. The machinable glass-ceramic is formed by mixing phyllosilicate material having a sheet structure, with a glass frit and firing the mixture at relatively low temperatures to sinter the phyllosilicate, while maintaining the sheet-like morphology of the phyllosilicate and its associated cleaving properties. The sintered machinable glass-ceramic can be machined with conventional metal working tools and includes the (Continued)

electrical properties of the phyllosilicate. Producing the sintered machinable glass-ceramic does not require the relatively high-temperature bulk nucleation and crystallization needed to form sheet phyllosilicate phases in situ.

19 Claims, 4 Drawing Sheets

(51) Int. Cl.
| | |
|---|---|
| C03C 8/02 | (2006.01) |
| C03C 3/064 | (2006.01) |
| C03C 3/066 | (2006.01) |
| C03C 8/04 | (2006.01) |
| C03C 10/00 | (2006.01) |
| C04B 35/18 | (2006.01) |
| C04B 33/14 | (2006.01) |
| C04B 33/13 | (2006.01) |
| C03C 4/00 | (2006.01) |
| C03C 8/00 | (2006.01) |

(52) U.S. Cl.
CPC ............... *C03C 4/02* (2013.01); *C03C 8/02* (2013.01); *C03C 8/04* (2013.01); *C03C 10/0036* (2013.01); *C03C 14/00* (2013.01); *C04B 33/13* (2013.01); *C04B 33/14* (2013.01); *C04B 35/18* (2013.01); *C04B 2235/36* (2013.01); *C04B 2235/365* (2013.01); *C04B 2235/5292* (2013.01)

(56) References Cited

U.S. PATENT DOCUMENTS

| | | | |
|---|---|---|---|
| 3,905,824 A * | 9/1975 | Grossman | ............... C03C 10/16 501/3 |
| 4,769,310 A * | 9/1988 | Gugger | ................... B44C 1/005 430/346 |
| 5,202,292 A | 4/1993 | Tanabe et al. | |
| 5,616,173 A | 4/1997 | Okamoto et al. | |
| 5,674,789 A | 10/1997 | Anquetil | |
| 6,362,119 B1 * | 3/2002 | Chiba | ................... C03C 14/004 501/15 |
| 6,590,318 B2 | 7/2003 | Nishikawa et al. | |
| 6,645,285 B2 | 11/2003 | Brodkin et al. | |
| 6,936,556 B2 | 8/2005 | Sridharan et al. | |
| 7,176,152 B2 | 2/2007 | Brown et al. | |
| 7,524,781 B2 | 4/2009 | Nagashima et al. | |
| 7,839,088 B2 | 11/2010 | Inoue et al. | |
| 7,868,548 B2 | 1/2011 | Bae et al. | |
| 8,021,999 B2 | 9/2011 | Beall | |
| 8,048,816 B2 | 11/2011 | Beall et al. | |
| 8,298,970 B2 | 10/2012 | Beall | |
| 8,772,189 B2 | 7/2014 | Singh et al. | |
| 9,171,657 B2 | 10/2015 | Molins et al. | |
| 9,315,413 B2 | 4/2016 | Singh et al. | |
| 9,540,274 B2 | 1/2017 | Sridharan et al. | |
| 9,637,409 B2 | 5/2017 | Singh et al. | |
| 9,670,089 B2 | 6/2017 | Yanase et al. | |
| 9,960,332 B2 | 5/2018 | Konishi et al. | |
| 2007/0236147 A1 | 10/2007 | Onoda | |
| 2010/0086825 A1 * | 4/2010 | Lamberson | ........ H04N 21/4821 429/495 |
| 2011/0209813 A1 | 9/2011 | Shibuya et al. | |
| 2013/0294818 A1 * | 11/2013 | Goedeke | ............. C03C 10/0036 403/270 |
| 2014/0193643 A1 * | 7/2014 | Akhtar | .................... C03C 3/085 428/428 |
| 2014/0370247 A1 * | 12/2014 | Detrie | .................... B23K 26/18 428/195.1 |

FOREIGN PATENT DOCUMENTS

| | | |
|---|---|---|
| EP | 0192844 A2 | 9/1986 |
| EP | 1643499 A1 | 5/2006 |
| JP | 57-77041 A | 5/1982 |
| JP | 2001146436 A | 5/2001 |
| JP | 2006206353 A | 8/2006 |
| JP | 2007176785 | 12/2007 |
| JP | 2010248034 A | 11/2010 |

OTHER PUBLICATIONS

Tozzi, Nilo. "The Chemistry, Physics and Manufacturing of Glaze Frits." Digital Fire, Jan. 19, 2010, digitalfire.com/article/thechemistry, physics and manufacturing of glaze frits. (Year: 2010).*
Prof. Stephen A. Nelson, (Micas, Chlorite, Talc, & Serpentine, 2015) https://www.tulane.edu/~sanelson/eens211/phyllosilicates.htm. (Year: 2015).*
International Search Report for corresponding PCT/US2016/064528 dated Apr. 6, 2017, one page.
Espacenet bibliographic data for CN1205991 published Jan. 17, 1999, two pages.
Espacenet bibliographic data for CN1827544 published Sep. 6, 2006, one page.
Espacenet bibliographic data for EP0192844 published Sep. 3, 1986, one page.
Espacenet bibliographic data for JP2001146436 published May 29, 2001, one page.
Espacenet bibliographic data for JP2006206353 published Aug. 10, 2006, one page.
Espacenet bibliographic data for JP2007176785 published Dec. 7, 2007, one page.
Espacene bibligraphic data for JP2010248034 published Nov. 4, 2010, one page.
Espacenet bibliographic data for JPS5777041 published May 14, 1982, one page.
Dong Tao, "Application of the Amazing Nb in Steel," Jun. 1999, p. 102.

* cited by examiner

SINTERING AID FOR GLASSES FOR MACHINABLE PHYLLOSILICATE BASED STRUCTURES

FIELD

The present subject matter relates to machinable glass-ceramic or ceramic composite or ceramic materials. The glass-ceramic material is formed by sintering a mixture of phyllosilicate material and a glass sintering aid.

BACKGROUND

Phyllosilicates are a family of sheet silicate minerals having complex crystal structures; essentially having a unique two-dimensional sheet structure including two layers or sheets of strongly bonded tetrahedrons having small cations ($Si^{4+}$, $Al^{3+}$, $B^{3+}$) bonded to oxygen anions, intervened by octahedrons having smaller cations ($Mg^{2+}$, $Zn^{2+}$, so on) bonded to oxygen or hydroxyl or fluoride ions. These two sheets face each other and are joined together by larger monovalent or bivalent cations (e.g. $K^+$, $Na^+$, $Rb^+$, $Cs^+$, $Ca^{2+}$, $Ba^{2+}$, $Sr^{2+}$) that provide a cleavage plane between the two sheets. The cleavage planes provide relatively easy separation of the two sheets, and thus impart easy machinability to the silicate material.

Micas are one group of phyllosilicates. Various kinds of micas such as muscovite, phlogopite, and biotite, occur naturally and have unique electrical and mechanical properties both in the direction of plates as well as in the perpendicular directions to these plates. Because of these unique electrical properties (e.g., lower dielectric constant and higher breakdown voltage), micas find extensive applications in electronic and electrical fields. Micas are ordinarily used in conjunction with a binder material, which supports the micas to form a monolithic structure suitable for use in electrical applications, or otherwise is used in a pure form as sheets or blocks, which requires expensive and high quality mica.

A class of glass-ceramics have been developed and marketed by Corning—called Macor®—as machinable glass-ceramics (e.g. U.S. Pat. Nos. 3,689,293 and 8,298,970). These composition have good electrical properties, yet are soft enough to be machined by ordinary woodworking tools. These glass-ceramic compositions are made from various oxide mixtures through bulk glass and ceraming routes. These procedures often require melting the oxide mixtures, casting the melt into a desired shape, performing a particular heating schedule for controlled nucleating and crystallizing the sheet silicate structure in situ to form the glass-ceramic material. The operations require relatively higher temperatures 1000-1400° C. for performing all the steps, and hence the glass-ceramic compositions are relatively expensive to make.

As such, there exists a need for improved processes for making machinable glass-ceramic compositions.

SUMMARY

The difficulties and drawbacks associated with previously known systems are addressed in the present compositions and methods involving glass sintering aids that are mixed with powders of phyllosilicates. Because the phyllosilicate powders are already formed and included in the mixture prior to sintering, the present subject matter enables formation of machinable glass-ceramic compositions by simply sintering the mixture at relatively low temperatures, for example less than about 950° C., or less than about 900° C.; however higher upper limits for the firing temperatures can be used, for example less than about 1000° C. or less than about 1050° C. Because the phyllosilicate powders are already included in the mixture prior to sintering, the present subject matter does not require performing a particular heating schedule for controlled nucleating and crystallizing a sheet silicate structure in situ in order to form the glass-ceramic material, and various embodiments of the present subject matter do not include performing such heating schedules for in situ nucleating and crystallizing operations.

The present subject matter relates to glass compositions and formulas that are used as sintering aids for phyllosilicate sheet minerals or flakes or powders (e.g. mica flakes). Because the mixture already includes phyllosilicate powders, conventional high temperature in situ crystal growth of two-dimensional silicate sheet structures is not required. Accordingly, conventional heating schedules at temperatures of 1000-1400° C. is not required, and in several embodiments such heating schedules are not included. Instead, the inventive mixtures can simply be sintered, for example at relatively low temperatures of about 450-950° C., to form monolithic glass-ceramic structures that are machinable to high tolerances using conventional high speed woodworking or metalworking tools. It will be understood that such low-temperature sintering may result in some microstructure crystal formation in addition to that which is already present in the pre-sintered composition. In one embodiment, the glass-ceramic structures have a machinability of 100% or more compared to the normalized value of AISI No. 1112 carbon steel determined by the American Iron and Steel Institute (AISI).

The resulting phyllosilicate sintered products substantially retain the silicate sheet structures of the phyllosilicate and maintain the corresponding electrical properties thereof, and thus can find applications in different electrical/electronic applications such as LTCC, electronic probe cards, substrates for thin films, high temperature electrical spacers in feedthroughs, computers, smart phones, smart appliances, smart windows, automotive applications such as in electric cars, driverless cars, telecommunication applications, wireless applications, consumer electronics applications, and in LED devices for example.

In one aspect, the present subject matter provides a sintered machinable glass-ceramic comprising a naturally occurring sheet phyllosilicate mineral as a continuous phase, and a glass component as a discontinuous phase. The glass component comprises before sintering, one or more of glass frit (A) including before firing $BaO+CaO+MgO+SrO$ at about 20-70 wt %, $Al_2O_3$ at about 2-20 wt %, $B_2O_3$ at about 2-20 wt %, and $SiO_2$ at about 10-50 wt %; glass frit (B) including before firing $ZnO+BaO$ at about 20-70 wt %, $CaO+MgO+SrO$ at about 0-25 wt %, $Al_2O_3$ at about 0.1-20 wt %, $B_2O_3$ at about 2-30 wt %, and $SiO_2$ at about 10-50 wt %; and glass frit (C) comprising before firing $Bi_2O_3+ZnO$ at about 20-95 wt %, $BaO+CaO+MgO+SrO$ at about 0-25 wt %, $Al_2O_3$ at about 10-20 wt %, $B_2O_3$ at about 2-30 wt %, and $SiO_2$ at about 0-50 wt %.

In another aspect, the present subject matter provides a method of forming a sintered machinable glass-ceramic. The method includes providing phyllosilicate in powder or flake form, and providing a glass component comprising one or more of glass frit (A) comprising before firing $BaO+CaO+MgO+SrO$ at about 20-70 wt %, $Al_2O_3$ at about 2-20 wt %, $B_2O_3$ at about 2-20 wt %, and $SiO_2$ at about 10-50 wt %; glass frit (B) including before firing $ZnO+BaO$ at about 20-70 wt %, $CaO+MgO+SrO$ at about 0-25 wt %, $Al_2O_3$ at about 0.1-20 wt %, $B_2O_3$ at about 2-30 wt %, and $SiO_2$ at about 10-50 wt %; and glass frit (C) comprising before firing $Bi_2O_3$+ZnO at about 20-95 wt %, BaO+CaO+MgO+SrO at about 0-25 wt %, $Al_2O_3$ at about 0-20 wt %, $B_2O_3$ at about 2-30 wt %, and $SiO_2$ at about 0-50 wt %. The method includes mixing the phyllosilicate powder and the glass component, and sintering the mixture of the phyllosilicate powder and the glass component to sinter the phyllosilicate, thereby forming a sintered machinable glass-ceramic. The method may also include the addition of a binder and/or vehicle in the mixing stage prior to firing, and making a pre-form by pressing, injection molding, slip casting, tape casting, or other method known to those skilled in the art. The phyllosilicate defines a continuous phase in the sintered machinable glass-ceramic and the glass component defines a discontinuous phase in the sintered machinable glass-ceramic. The phyllosilicate substantially maintains its plate-like structure after sintering.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The subject matter described herein provides mixtures including a glass component including one or more glass frits, and phyllosilicate powder, which mixture can be sintered to form machinable glass-ceramic or ceramic structures. The glass component comprising glass frit is used as a sintering aid for the phyllosilicate powder. The present subject matter includes heating the mixture to less than about 950° C., less than about 900° C., or about 450-950° C. for softening or melting the glass frit and sintering the mixture to form a glass-ceramic structure.

In this respect, the glass component includes a glass frit, which is used as a sintering aid to bind together the phyllosilicate powder and provide structure, strength, and rigidity to the sintered product. Because the mixture is only heated in one embodiment, to about 450-950° C., the process is less costly than conventional in situ preparation of glass-ceramic material, which require performing a particular heating schedule at about 1000-1400° C. to melt an oxide mixture to form a glass, and for controlled nucleating and crystallizing the glass to form a sheet silicate structure in situ. Furthermore, the sintered product of the present subject matter maintains the electrical properties and cleavability of the phyllosilicate materials because the phyllosilicate structure is not destroyed during sintering.

The sintered machinable glass-ceramic structures include the phyllosilicate as the continuous phase, and the glass component as the discontinuous phase. The continuous phase of phyllosilicate provides excellent electrical properties, and acts as a crack arrestor for the sintered structures during machining, such that machining the structure does not result in a crack, break, or cut spreading uncontrollably throughout the mass of the structure, and allows for the size and shape of the structure to be easily modified as required.

In one embodiment, the final sintered glass-ceramic product has the following electrical properties, with a dielectric constant of about four to six, and a breakdown voltage of about 1000 Volts/mil.

Because phyllosilicate powder is already present in the mixture, the process does not require conventional in situ formation of silicate sheet structures from glass. As such, formation of the glass-ceramic products only requires relatively low-temperature sintering of the glass component, which is lower than the firing temperature required for in situ nucleation and crystal growth of silicate plate structures. As will be understood, although in situ crystallization is not required by the present subject matter, sintering the mixture may result in some level of nucleation and in situ crystal growth of silicate plate structures in the sintered product.

The mixture includes a glass component as a sintering aid, phyllosilicate powder as a continuous phase, and may include other optional additives for particular applications or to achieve particular properties in the final sintered product. Unless otherwise noted, all compositional percentages disclosed herein are by weight and are given for a blend prior to firing. Numerical ranges of oxides or other ingredients that are bounded by zero on the lower end (for example, 0-7% by weight) are intended to provide support for the concept "up to [the upper limit]." Of the ingredients. For example, "0-7% by weight SrO" is intended to provide support for "up to 7% SrO by weight" as well as a positive recitation that SrO is present at some amount, for example at 0.01 wt % or 0.1 wt %, and in an amount that does not exceed the upper limit. An example of the latter is "comprises SrO, provided the amount does not exceed 10% by weight."

All ranges disclosed herein are to be understood to encompass the beginning and ending range values and any and all subranges therein. For example, a stated range of "7 wt % to 17 wt %" should be considered to include any and all subranges between (and inclusive of) the minimum value of 7 and the maximum value of 17; that is, all subranges beginning with a minimum value of 7 or more and ending with a maximum value of 17 or less, e.g., 7.0 to 8.7, 9.3 to 12.9, 11.7 to 17, etc.

Glass Component

In accordance with the present subject matter, machinable glass-ceramic structures are formed by using mixture of phyllosilicate powder (e.g. mica powder) and a glass component as a sintering aid for the phyllosilicate powder. In several embodiments, the glass component includes glass frit.

During heating of the mixture, the glass component softens or melts to sinter the phyllosilicate powder into a monolithic structure. The heating is controlled to below a melting point of the phyllosilicate powder, so that the silicate sheet structure of the phyllosilicate powder is not substantially compromised. The heating is controlled to a sufficiently high temperature to soften the glass so that the glass is able to wet, bond and sinter the phyllosilicate flakes or powders into a monolithic structure. The interaction between the inventive glass compositions and the ceramic phase is limited in such a way as to not overly sinter the structure and destroy the plate structures of the phyllosilicate continuous phase. Maintaining the sheet structures allows the corresponding electrical properties of the powder to also be maintained. In this way, the electrical properties of the phyllosilicate powder are therefore substantially provided to the final sintered product.

In several embodiments, the present subject matter provides a glass component that has a sintering temperature of about 450-950° C., about 600-950° C., about 800-900° C., or in one aspect of about 850° C. In other embodiments, the present subject matter includes sintering temperatures of about 850-950° C., about 750-950° C., about 650-850° C., or about 400-650° C. These temperatures are much lower than those required for traditional formation of conventional glass-ceramic structures by melting a mixture of metal oxides, casting the melt, and in situ nucleating and crystallizing of silicate sheet structures in the cast object, which normally require heating to about 1000-1400° C.

The glass component can comprise about 5-75 weight percent (wt %), or about 8-71 wt %, about 31-71 wt %, or about 40-60 wt %, or in one aspect of about 45-55 wt % of the total weight of the glass component and the phyllosilicate powder.

One difficulty of forming glass sintering aids for these applications is maintaining the machinability of the sintered composite. In this regard, the instant glass compositions do not significantly affect the cleavability of the two-dimensional sheet structure of phyllosilicates, and thereby provide machinability similar to bulk crystallized glass-ceramics such as Macor® glass ceramics developed by Corning. Another difficulty is producing glass-ceramic monolithic structures free of thermal expansion mismatch cracks. The glass compositions are therefore tailored to have a coefficient of thermal expansion close to that of the particular phyllosilicate(s) being used.

In accordance with the present subject matter, the glass component is specifically formulated to preserve the plate structure of the phyllosilicate. To achieve this, the glass component is formulated so that the phyllosilicate powder does not significantly dissolve in the glass component during sintering. In one aspect, the glass component can include high concentrations of aluminum, boron, and silicon oxides, which are believed to inhibit aluminum, boron, and silicon present in the phyllosilicate powder from dissolving in the molten glass component. Because the phyllosilicate powder does not significantly dissolve in the molten glass, the phyllosilicate powder maintains its plate structure and cleavability, and substantially remains as a distinct phase in the sintered glass-ceramic. The cleavability of the phyllosilicate provides the desired machinability to the sintered glass-ceramic structure.

The glass component can be a single glass frit material, or a combination of two or more glass frits. In several aspects, the glass component includes two or more glass frits, e.g. a mixture of a first glass frit and a second glass frit.

Glass, frits are typically produced by batching and mixing the desired components, melting the mixture at high temperature, and quenching the molten glass. The glass components can be in the form of metal oxides, mixed metal oxides, metal compounds that decompose to form metal oxides or mixed metal oxides, such as hydroxides, carbonates, and nitrates, metal halides, and minerals that are metal oxides or mixed Metal oxides or metal halides such as feldspar, fluorspar, and cryolite, where the term metal oxide is used in an older, looser sense that includes elemental oxides such as $SiO_2$, $P_2O_5$, $SeO_2$, and $TeO_2$. In several embodiments, the glass frit is modified, such as by milling or grinding, to form glass frit powder of a desired average particle size, typically about 0.5-50 μm, about 1-30 μm, or about 3-20 μm. In one aspect, the glass component includes one glass frit or a mixture of different glass frits, each with average particle sizes within 1-50 μm. The glass component used in the present mixtures is preferably in the form of glass frit having an average particle size of 0.5-20 μm, 0.5-15 μm, 0.5-5 μm, or 1-3 μm.

During grinding to size the glass frit, conventional milling techniques can be employed and certain additives can be added to adjust the properties of the glass frit, the pre-sintered mixture, or the sintered glass-ceramic. Milling fineness is not critical, but a fineness of about 2 grams being retained from a 50 gram sample using a 200 mesh sieve is acceptable. Other particle size distributions may also be utilized. After milling, it may be desired to subject the milled pre-sintered mixture to a post milling thermal treatment, such as exposure to temperatures of about 200° F. (93° C.) or more for about 18 hours or more.

In environmentally sensitive applications, the glass compositions may be substantially free of lead and cadmium. As used throughout the instant specification and in the appended claims, the phrase "lead-free and cadmium-free" means that no lead compound (oxide, nitrate, oxalate, sulfate, chloride), such as PbO, $Pb_3O_4$, or cadmium compound (oxide, nitrate, oxalate, sulfate or chloride), such as CdO, has been intentionally added to the composition, and that the composition comprises less than about 0.1% by weight Pb or Cd after firing.

A typical glass that can be used is an alkaline earth borosilicate glass, such as barium borosilicate glass. While not being bound to any particular theory, it is believed that believe that glasses in this system, especially those including the combination of cations $Ba^{2+}$, $Ca^{2+}$, provide preservation of cleavage layers in the phyllosilicate sheet structures by not significantly dissolving the larger cations in the silicate sheet structures, yet providing enough driving force to bond to the octahedral layers of the sheet structures. It is believed that combinations of $Al^{3+}$, $B^{3+}$ and $Si^{4+}$ cations provide moderation in the dissolution of backbones of the silicate sheet structures by these same small cations.

Table 1 below shows exemplary alkaline earth borosilicate glass frits comprising before firing, the listed oxides and amounts. Typical and preferred oxide ranges are shown, with all values in weight percent unless otherwise indicated. It will be understood that the glass frits are not necessarily limited to the listed oxides, and can comprise other oxides as or desired.

TABLE 1

Glass Frit Formulation Ranges (weight %)

| Component | Typical | Preferred | More Preferred | Most Preferred |
|---|---|---|---|---|
| BaO | 20-70 | 20-70 | 20-70 | 30-65 |
| CaO | | | | 2-15 |
| MgO | | | — | — |
| SrO | | | — | — |
| $Al_2O_3$ | 2-20 | 2-15 | 2-15 | 2-8 |
| $B_2O_3$ | 2-20 | 2-15 | 2-15 | 4-12 |
| $SiO_2$ | 10-50 | 10-45 | 15-45 | 15-35 |

The glass frit formulations can comprise additional oxides including ZnO, CuO, $TiO_2$, $ZrO_2$, $Nb_2O_5$, $Ta_2O_5$, $MoO_3$, $WO_3$, $SnO_2$, $Sb_2O_5$, $Bi_2O_3$, $Y_2O_3$, $La_2O_3$, and $CeO_2$, $V_2O_5$, $TeO_2$, FeO, MnO, $Cr_2O_3$, $Co_2O_3$. Also, the glass frit formulations can have anions based on F, Cl, S and Se.

By including a glass component with these ranges of oxides shown in Table 1, a sintered glass-ceramic body can be provided by heating the mixture to about 750-950° C., with use temperatures for the glass-ceramic of up to about 600-650° C.

One such suitable glass is EG3118 available from Ferro Corporation of Cleveland, Ohio, which will provide a sintered glass-ceramic structure when sintered at about 900° C. and provide use temperatures of about 650° C. In experiments using this glass with mica powder, SEM (scanning electron microscope) images show that these high barium glasses provide controlled sintering of mica plates without the mica substantially losing its plate-like morphology. While not being bound to any particular theory, it is believed that this controlled sintering helps to retain the machinability of the glass-ceramic sintered body.

Other glass systems can be used for sintering temperatures within the range of 700-950° C., including high barium glasses such as BAS82, which is a barium aluminosilicate glass available from Ferro Corporation of Cleveland, Ohio, or BBS2, which is a barium aluminosilicate glass containing titania available from Ferro Corporation of Cleveland, Ohio.

If sintering temperatures of 850-950° C. are desired, other suitable glass systems include barium boro alumino silicate glasses, such as EG2810 available from Ferro Corporation of Cleveland, Ohio.

If still lower firing temperatures are desired, such as 650-850° C., then $ZnO$—$B_2O_3$—$Al_2O_3$—$SiO_2$ glasses can be used, such as EG3046, EG3256, EG2807 available from Ferro Corporation of Cleveland, Ohio. Table 2 below shows exemplary lower firing glass frits, which comprise before firing the listed oxides and amounts. Typical and preferred oxide ranges are shown, with all values in weight percent unless otherwise indicated. It will be understood that the glass frits are not necessarily limited to the listed oxides, and can comprise other oxides.

TABLE 2

Glass Frit Formulation Ranges (weight %)

| Component | Typical | Preferred | More Preferred | Most Preferred |
|---|---|---|---|---|
| ZnO | 20-70 | 20-70 | 20-70 | 20-35 |
| BaO | | | | 2-15 |
| (CaO + MgO + SrO) | 0-25 | 0-25 | 0-25 | 0-20 |
| $Al_2O_3$ | 0.1-20 | 2-15 | 2-15 | 1-8 |
| $B_2O_3$ | 2-30 | 2-25 | 5-25 | 10-25 |
| $SiO_2$ | 10-50 | 10-45 | 15-45 | 15-45 |

$Bi_2O_3$—ZnO—$B_2O_3$—$Al_2O_3$—$SiO_2$ glasses, such as EG2964, EG3030, EG2934 available from Ferro Corporation of Cleveland, Ohio can also be used if still further lower firing temperatures, such as 400-650° C. are desired. Table 3 below shows exemplary even lower firing glass frits, which comprise before firing, the listed oxides and amounts. Typical and preferred oxide ranges for the exemplary glass frits are shown, with all values in weight percent unless otherwise indicated. It will be understood that the glass frits are not necessarily limited to the listed oxides, and can comprise other oxides.

TABLE 3

Glass Frit Formulation Ranges (weight %)

| Component | Typical | Preferred | More Preferred | Most Preferred |
|---|---|---|---|---|
| $Bi_2O_3$ | 20-95 | 20-70 | 20-70 | 30-65 |
| ZnO | | | | 2-30 |
| (BaO + CaO + MgO + SrO) | 0-25 | 0-25 | 0-20 | 0-15 |
| $Al_2O_3$ | 0-20 | 0-15 | 0.1-15 | 0.1-8 |
| $B_2O_3$ | 2-30 | 2-25 | 2-20 | 4-20 |
| $SiO_2$ | 0-50 | 10-45 | 15-45 | 0-35 |

In one embodiment, the glass frit formulation, including those disclosed in Tables 1-3, may include before firing at least 1 wt % (BaO+CaO) to modulate the reactivity with phyllosilicate so that the plate structures of the phyllosilicate continuous phase is not destroyed by the glass frit during sintering.

The CTE of a preferred glass component can be from about $60 \times 10^{-7}$/° C., or from about $120 \times 10^{-7}$/° C., or from about $80 \times 10^{-7}$/° C. to about $110 \times 10^{-7}$/° C. The softening point of a preferred glass can range from about 550° C., about 900° C., or from about 650° C. to about 750° C. The Tg of a preferred glass can range from about 400° C., to about 725° C., or about 600° C.

Additional amounts of inorganic fillers, usually crystalline oxides, may be added to affect the flow temperature and other properties of the glass composition above the Tg. Such crystalline oxides may also act as nucleating agents to promote partial or local crystallization. Suitable fillers include alumina, anorthite, gahnite, mullite, bismuth oxide, boron oxide, fused silica, crystalline silica (e.g. quartz, cristobalite, tridymite—both the α- and β-forms are suitable), molybdenum oxide, titania, titanates, magnesium silicate, calcium silicate, strontium silicate, barium silicate, magnesium titanate, calcium titanate, strontium titanate, barium titanate, eucryptite (both the α- and β-forms are suitable), cordierite, cobalt oxide, chromium oxide, tungsten oxide, zinc oxide, zinc silicate, zircon, and zirconia, alkaline earth borates, zinc borate, zirconyl phosphates among others.

Phyllosilicates

In accordance with the present subject matter, one or more phyllosilicates are mixed with one or more glass components and/or fillers, and sintered to form a ceramic-glass structure. Phyllosilicates are sheet silicates having parallel sheets of silicate tetrahedra represented by $(Si_2O_5)^{2-}$. The powders can include naturally occurring phyllosilicate minerals, synthetically prepared silicate sheet structures, or a combination thereof.

The phyllosilicates minerals are not particularly limited by the present subject matter and can include one or more of phyllosilicates from the Serpentine, Clay, Mica, and Chlorite groups. In one embodiment, the mixture includes a Mica group phyllosilicate, including one or more of Biotite—$K(Mg,Fe)_3(AlSi_3)O_{10}(OH)_2$, Muscovite—$KAl_2(AlSi_3)O_{10}(OH)_2$, Phlogopite—$KMg_3(AlSi_3)O_{10}(OH)_2$, Lepidolite—$K(Li,Al)_{2-3}(AlSi_3)O_{10}(OH)_2$, Margarite—$CaAl_2(Al_2Si_2)O_{10}(OH)_2$, and Glauconite—$(K,Na)(Al,Mg,Fe)_2(Si,Al)_4O_{10}(OH)_2$.

Other types of phyllosilicates can be used, such as Antigorite—$Mg_3Si_2O_5(OH)_4$, Chrysotile—$Mg_3Si_2O_5(OH)_4$, Lizardite—$Mg_3Si_2O_5(OH)_4$, Halloysite—$Al_2Si_2O_5(OH)_4$, Kaolinite—$Al_2Si_2O_5(OH)_4$, Illite—$(K,H_3O)(Al,Mg,Fe)_2(Si,Al)_4O_{10}[(OH)_2,(H_2O)]$, Montmorillonite—$(Na,Ca)_{0.33}(Al,Mg)_2Si_4O_{10}(OH)_2 \cdot nH_2O$, Vermiculite—$(MgFe,Al)_3(Al,Si)_4O_{10}(OH)_2 \cdot 4H_2O$, Talc—$Mg_3Si_4O_{10}(OH)_2$, Sepiolite—$Mg_4Si_6O_{15}(OH)_2 \cdot 6H_2O$, Palygorskite (or Attapulgite)—$(Mg,Al)_2Si_4O_{10}(OH) \cdot 4(H_2O)$, Pyrophyllite—$Al_2Si_4O_{10}(OH)_2$, Chlorite—$(Mg,Fe)_3(Si,Al)_4O_{10}(OH)_2 \cdot (Mg,Fe)_3(OH)$.

The phyllosilicate can be provided in the form of a powder or flakes. They can be processed into a powder by one or more size reductions operations. The phyllosilicate powder can range in size from about submicron to several microns in length in an axis and can be included at about 40-98 wt % compared to the total weight of the phyllosilicate and glass component.

Additives

The pre-sintered mixture of phyllosilicate and glass sintering aid can include one or more additives for adjusting certain properties of the mixture or of the final sintered product. The additives are not particularly limited by the present subject matter, and can include any additive as desired for a particular application. Additives to be included in the mixture will vary depending on the whether the mixture will be in a dry powder or a wet mixture form, and will also depend on the technique that will be used to form the mixture into a particular shape.

Suitable additives include ceramic fillers, such as cordierite, zircon, mullite, or low expansion ceramics such as Zirconyl phosphate, wollastonite, crystalline silica, amorphous silica, Feldspars, Zeolites, or Willemite for adjusting properties such as thermal expansion, machinability, dielectric constant and the like. These additives include the inorganic fillers listed elsewhere herein.

Additionally, one or more additives, such as a solvent or thickener, can be included to adjust the rheology of the pre-sintered mixture, or a coloring agent can be included to provide a color to the sintered product. The coloring agent may include for example, metal oxides and or complex inorganic pigments such as, but not limited to Corundum structure Pigment Green 17, Pigment Brown 29, Red 101, Red 102, Red 230, Red 231, Rutile structure Pigment Black 24, Brown 24, Brown 37, Brown 40, Yellow 53, Yellow 161, Yellow 162, Yellow 163, Yellow 164, Yellow 189, Red 236, Spinel structure Pigment Black 12, Black 26, Black 27, Black 28, Black 29, Black 30, Blue 28, Blue 36, Blue 72, Brown 33, Brown 34, Brown 35, Green 26, Green 50, and other structures such as Borate Violet 48, Garnet Green 51, Olivine Blue 73, Periclase Black 25, Phenacite Blue 74, Phosphate Violet 14, Violet 47, Priderite Yellow 157, Pyrochlore Yellow 41, Sphene Red 233, and Zircon Blue 71, Red 232, and Yellow 159. Other coloring agents can be used.

Other suitable additives include one or more binders for adjusting the green strength of the mixture. The binder are not particularly limited, and may include organic binders, such as PVA, starches, carboxymethylcellulose, PEG, or paraffin for example, or inorganic binders such as sodium silicate, or bentonite clay for example. Additionally, dispersants and/or nanoparticles can be included to improve the mixing of the phyllosilicate and glass component.

The additives can be included up to about 20 wt % or more of the combined weight of the phyllosilicate, glass component, and additive. In one exemplary embodiment, the additives are included from about 0.1-5.0 wt %, or about 0.2-2.0 wt %.

Methods

The present subject matter includes various methods of mixing the phyllosilicate and glass component, forming the mixture into a pre-sintered structure, and firing the structure to form a sintered product.

In one embodiment, the phyllosilicate and glass component are mixed as a dry powder by dry mixing, or by dry milling for example. If milling is employed, care should be taken to avoid substantially degrading the sheet structures present in the phyllosilicate. A binder may be included for adding green strength to the mixture so the mixture can be formed, for example by dry pressing or hot pressing, into a desired shape or structure. The mixture can be formed into a coating on a substrate, a tape, a sheet, or a block, for example, which are then heated to form a final sintered product. Heating the mixture may result in complete or partial burn out of the binder, liquid vehicle, or other volatile components.

In other embodiments, the phyllosilicate and glass component are mixed with a solvent or aqueous vehicle to form a wet mixture, such as a water-based slurry or paste, for example. The wet mixture can be prepared by conventional wet mixing or milling procedures. These wet mixtures can include a liquid vehicle, which can comprise water, solvent, or a combination thereof. The solvent can comprise polar or non-polar solvents including alcohols, glycols, ethers, alkanes, or the like. The liquid vehicle can also include a binder dissolved or dispersed in the water and/or solvent. The binder can include any saccharides and their derivatives, proteins such as gelatin, natural or synthetic polymers, or a combination thereof.

The pre-sintered mixture is then formed into a desired shape. Depending on the mixture being a dry or a wet mixture, forming it into a desired shape can be performed by dry pressing, hot pressing, tape casting, slip casting, doctor blading, or stencil printing, roll coating or roll compaction, injection molding, and 3-D printing for example. Other techniques can be used as desired for a particular application, including spray drying or a pre-heating operation to remove the liquid vehicle from the mixture to allow the mixture to be pressed into a particular shape.

The pre-sintered mixture can also be coated onto a substrate. When provided in the form of a dry powder, the pre-sintered mixture can be applied to a substrate by well-known powder coating processes, such as electrostatic coating or the like. When provided as a wet mixture, such as a water-based slurry or paste, the pre-sintered mixture can be applied to a substrate by well-known liquid coating processes, such as spray coating, dipping, flow coating, or screen printing, for example.

The mixture is then fired to sinter the glass component and to burn off any volatile additives that may be present, thereby forming the sintered glass-ceramic product. Once the mixture is formed into a desired shape, it is typically fired at temperatures ranging anywhere from about 600° C. to about 950° C. for about 10-1000 minutes. Such firing temperatures and durations operate to sinter the phyllosilicate component that is present in the mixture, thus forming a sintered glass-ceramic product. It will be appreciated that a range of firing schedules could be used.

EXAMPLES

In order to further assess the various aspects and benefits of the present subject matter, a series of investigations were undertaken to evaluate the sintered glass-ceramic sintered products.

Figure 1:
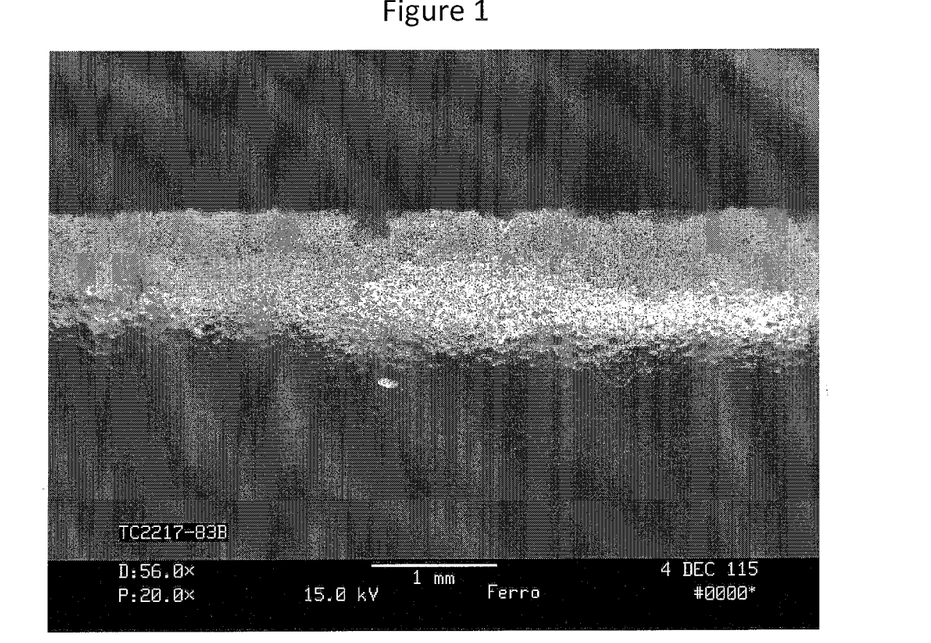
FIG. 1 is a SEM image of an embodiment of an example glass-ceramic sintered product in accordance with the present subject matter.
Figure 2:
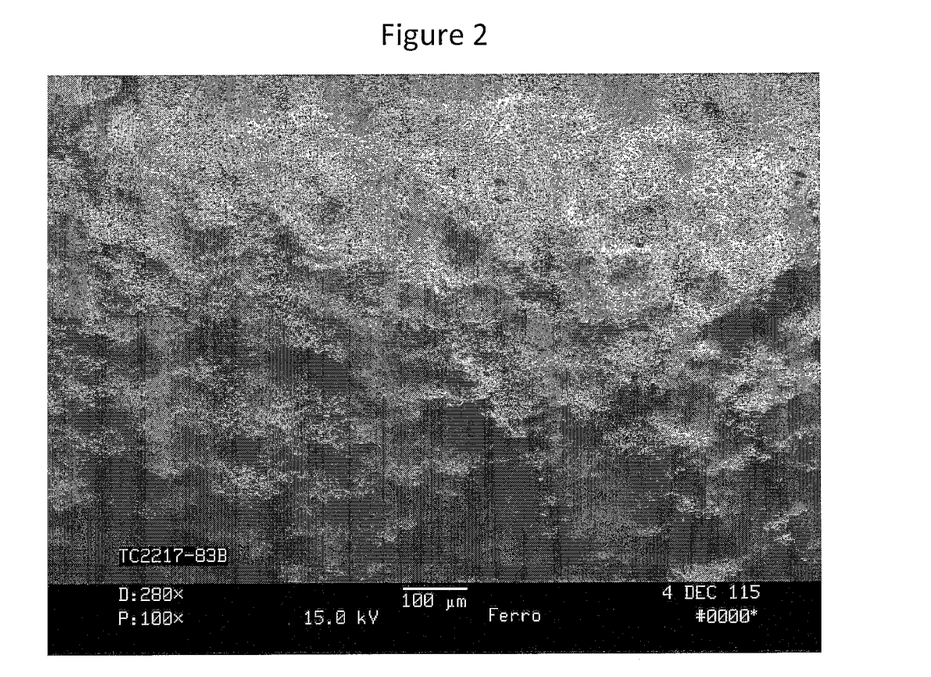
FIG. 2 is an SEM image of an embodiment of an example glass-ceramic sintered product in accordance with the present subject matter.
Figure 3:
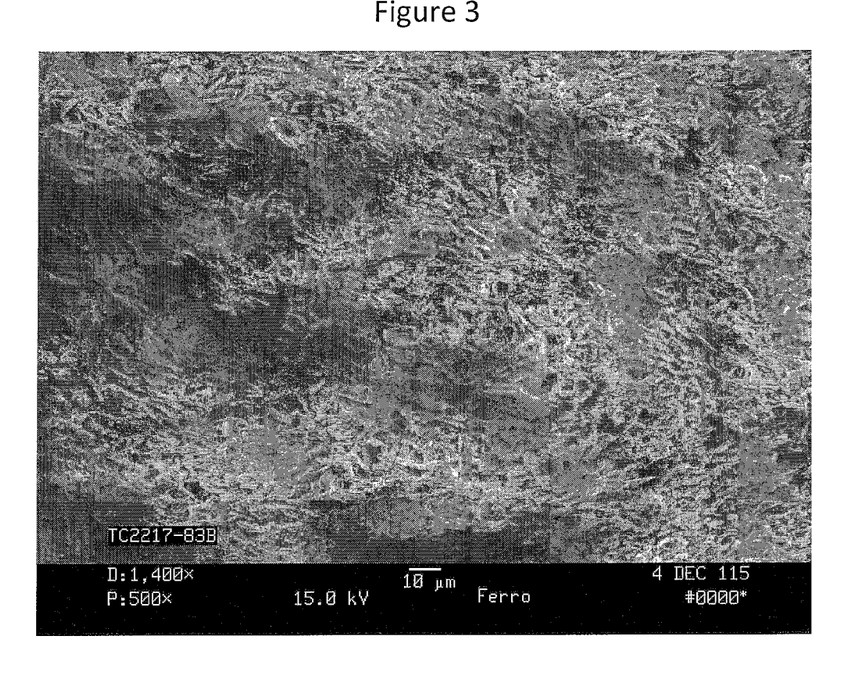
FIG. 3 is an SEM image of an embodiment of an example glass-ceramic sintered product in accordance with the present subject matter.
Figure 4:
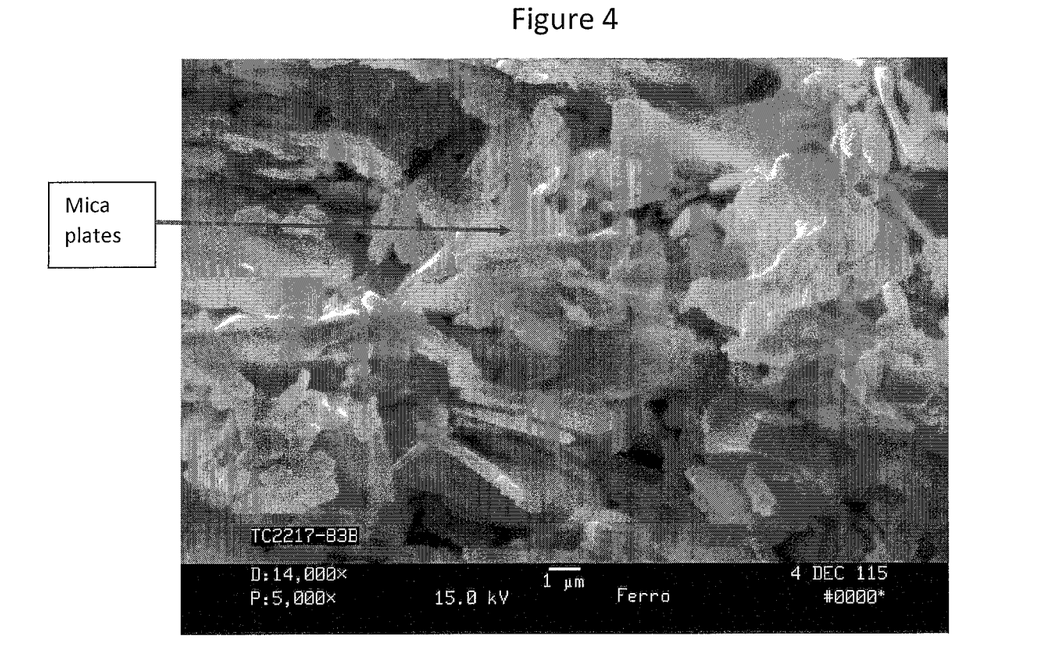
FIG. 4 is an SEM image showing individual mica plates of an example glass-ceramic sintered product in accordance with the present subject matter.
Figure 5:
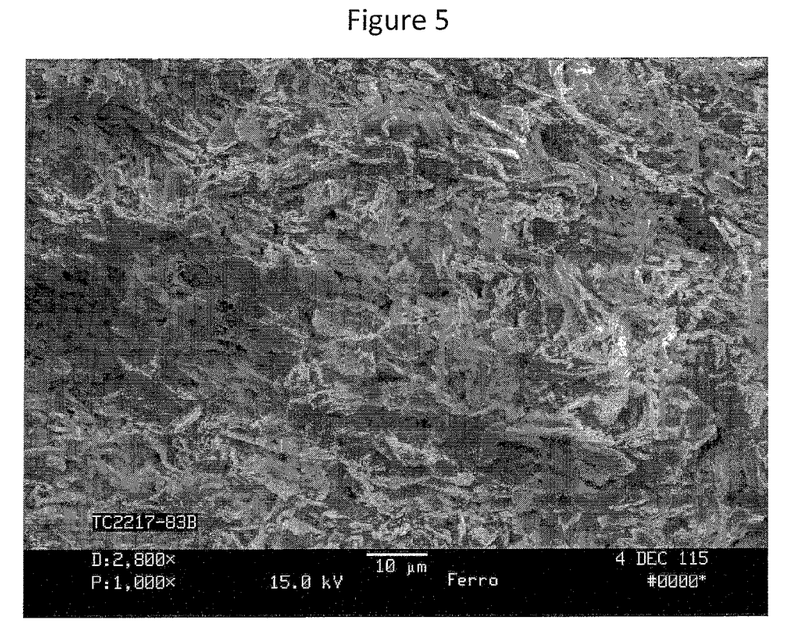
FIG. 5 is an SEM image of an embodiment of an example glass-ceramic sintered product in accordance with the present subject matter.
Figure 6:
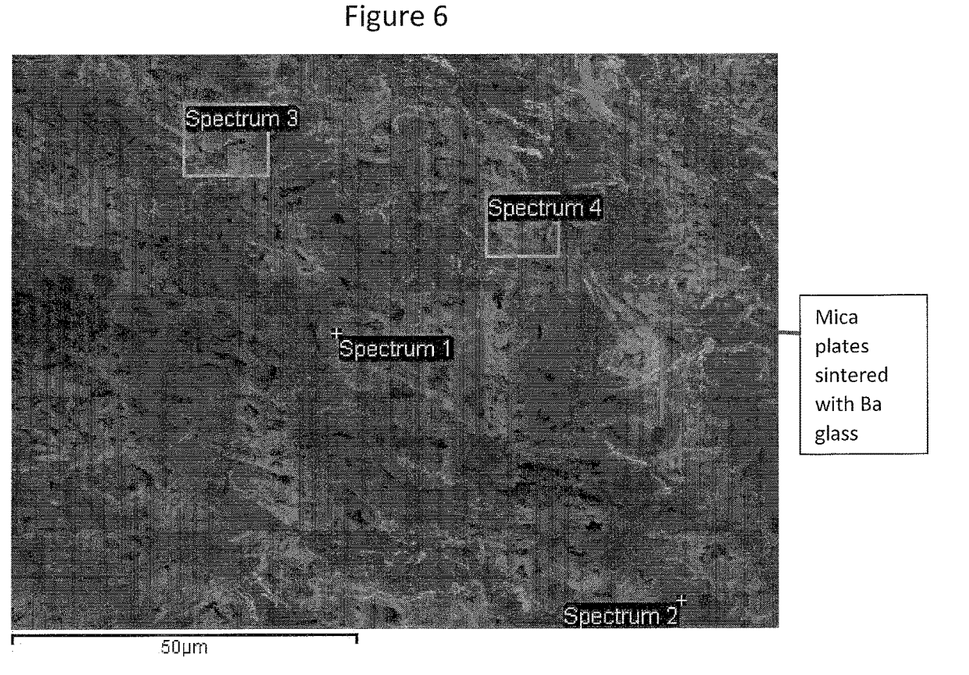
FIG. 6 is an SEM image of an embodiment of an example glass-ceramic sintered product showing spectrum locations in accordance with the present subject matter.
Figure 7:
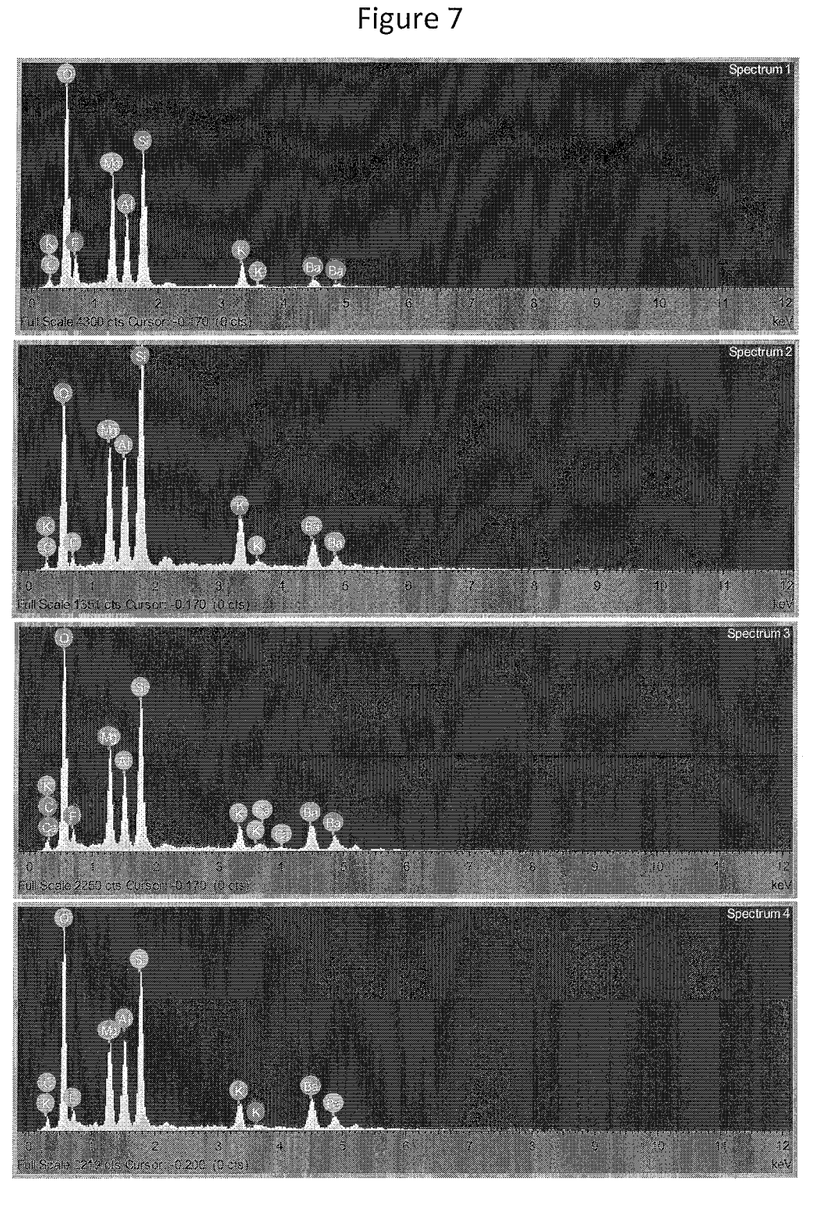
FIG. 7 is a set of four energy-dispersive X-ray spectroscopy (EDS) spectra taken from the example glass-ceramic sintered product, of FIG. 6.

A glass frit according to the most preferred glass formulation from Table 1 was dry mixed with mica powder, pressed, and fired to form a glass-ceramic sintered product. FIGS. 1-7 depict various aspects of the example glass-ceramic sintered product. FIGS. 1-6 show various magnifications of SEM images of the example glass-ceramic sintered product, and disclose that the mica present in the example retain their plate-like morphology. FIG. 7 shows a series of four EDS spectra taken from the example glass-ceramic sintered product, demonstrating sintering and retainment of the phyllosilicate structure. Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A sintered machinable glass-ceramic comprising phyllosilicate ceramic defined as a continuous phase, and a glass component defined as a discontinuous phase, the glass component including a glass frit,
the glass frit comprising before firing
BaO at 30-65 wt %,
CaO at 2-15 wt %,
$Al_2O_3$ at 2-8 wt %,
$B_2O_3$ at 4-12 wt %, and
$SiO_2$ at 15-35 wt %.

2. The machinable glass-ceramic according to claim 1, wherein the glass component is included at 8-71 wt % of the total weight of the phyllosilicate ceramic and the glass component.

3. The machinable glass-ceramic according to claim 2, wherein the glass component is included at 40-60 wt % of the total weight of the phyllosilicate ceramic and the glass component.

4. The machinable glass-ceramic according to claim 3, wherein the glass component is included at 45-55 wt % of the total weight of the phyllosilicate ceramic and the glass component.

5. The machinable glass-ceramic according to claim 1, wherein the phyllosilicate ceramic before sintering, is in the form of a powder or flakes.

6. The machinable glass-ceramic according to claim 1, wherein the phyllosilicate ceramic comprises a mica group phyllosilicate mineral.

7. The machinable glass-ceramic according to claim 1, further comprising before firing an inorganic filler selected from the group consisting of alumina, anorthite, gahnite, mullite, bismuth oxide, boron oxide, fused silica, crystalline silica, molybdenum oxide, titania, titanates, magnesium silicate, calcium silicate, strontium silicate, barium silicate, magnesium titanate, calcium titanate, strontium titanate, barium titanate, eucryptite, cordierite, cobalt oxide, chromium oxide, tungsten oxide, zinc oxide, zinc silicate, zircon, and zirconia, alkaline earth borates, zinc borate, zirconyl phosphates, and combinations thereof.

8. The machinable glass-ceramic according to claim 1, further comprising before firing a coloring agent selected from the group consisting of Corundum structure Pigment Green 17, Pigment Brown 29, Red 101, Red 102, Red 230, Red 231, Rutile structure Pigment Black 24, Brown 24, Brown 37, Brown 40, Yellow 53, Yellow 161, Yellow 162, Yellow 163, Yellow 164, Yellow 189, Red 236, Spinel structure Pigment Black 12, Black 26, Black 27, Black 28, Black 29, Black 30, Blue 28, Blue 36, Blue 72, Brown 33, Brown 34, Brown 35, Green 26, Green 50, and other structures such as Borate Violet 48, Garnet Green 51, Olivine Blue 73, Periclase Black 25, Phenacite Blue 74, Phosphate Violet 14, Violet 47, Priderite Yellow 157, Pyrochlore Yellow 41, Sphene Red 233, and Zircon Blue 71, Red 232, Yellow 159, and combinations thereof.

9. The machinable glass-ceramic according to claim 1, wherein the phyllosilicate ceramic substantially maintains its plate-like structure after sintering.

10. A method of forming a sintered machinable glass-ceramic, the method comprising:
providing phyllosilicate in powder or flakes form,
providing a glass component comprising a glass frit,
the glass frit comprising before firing
BaO at 30-65 wt %,
CaO at 2-15 wt %
$Al_2O_3$ at 2-8 wt %,
$B_2O_3$ at 4-12 wt %, and
$SiO_2$ at 15-35 wt %,
mixing the phyllosilicate powder and the glass component, and
sintering the mixture of the phyllosilicate powder and the glass component, thereby forming a sintered machinable glass-ceramic;
wherein the phyllosilicate defines a continuous phase in the sintered machinable glass-ceramic and the glass component defines a discontinuous phase in the sintered machinable glass-ceramic; and
wherein the phyllosilicate substantially maintains its plate-like structure after sintering.

11. The method according to claim 10, wherein the glass component is included at 8-71 wt % of the total weight of the phyllosilicate powder and the glass component.

12. The method according to claim 11, wherein the glass component is included at 40-60 wt % of the total weight of the phyllosilicate powder and the glass component.

13. The method according to claim 12, wherein the glass component is included at 45-55 wt % of the total weight of the phyllosilicate powder and the glass component.

14. The method according to claim 10, wherein the phyllosilicate comprises a mica group phyllosilicate mineral.

15. The method according to claim 10, wherein mixing includes adding a binder to the mixture of the phyllosilicate powder and the glass component.

16. The method according to claim 15, further comprising pressing the mixture into a desired shape before firing.

17. A sintered machinable glass-ceramic comprising phyllosilicate ceramic, and a glass component including a glass frit,
the glass frit comprising before firing
BaO at 30-65 wt %,
CaO at 2-15 wt %,
$Al_2O_3$ at 2-8 wt %,
$B_2O_3$ at 4-12 wt %, and
$SiO_2$ at 15-35 wt %, and
further comprising one or more oxides selected from the group consisting of $Nb_2O_5$, $Ta_2O_5$, $Sb_2O_5$, $Y_2O_3$, $La_2O_3$, $CeO_2$, and $TeO_2$.

18. The machinable glass-ceramic according to claim 17, wherein the glass component is included at 8-71 wt % of the total weight of the phyllosilicate ceramic and the glass component.

19. The machinable glass-ceramic according to claim 17, wherein the softening point of the machinable glass-ceramic ranges from 550° C. to 900° C.

* * * * *